United States Patent
Suram et al.

(10) Patent No.: US 9,516,065 B2
(45) Date of Patent: Dec. 6, 2016

(54) SECURE COMMUNICATION DEVICE AND METHOD

(71) Applicants: Chandra Sekhar Suram, Secunderabad (IN); Amruta Deshpande, Hyderabad (IN); Jyothi Vemulapalli, Secunderabad (IN)

(72) Inventors: Chandra Sekhar Suram, Secunderabad (IN); Amruta Deshpande, Hyderabad (IN); Jyothi Vemulapalli, Secunderabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 87 days.

(21) Appl. No.: 14/582,133

(22) Filed: Dec. 23, 2014

(65) Prior Publication Data
US 2016/0182463 A1  Jun. 23, 2016

(51) Int. Cl.
*H04L 29/06* (2006.01)

(52) U.S. Cl.
CPC .......... *H04L 63/205* (2013.01); *H04L 63/061* (2013.01); *H04L 63/164* (2013.01)

(58) Field of Classification Search
CPC .. H04L 63/0435; H04L 63/205; H04L 63/061; H04L 63/164
USPC ........ 713/153, 171, 164, 165; 380/277, 225, 380/247; 726/12, 14, 15
See application file for complete search history.

(56) References Cited

U.S. PATENT DOCUMENTS

| | | | |
|---|---|---|---|
| 6,236,727 B1* | 5/2001 | Ciacelli | G06F 21/10 280/10 |
| 6,539,483 B1* | 3/2003 | Harrison | H04L 12/4641 707/999.01 |
| 6,629,243 B1* | 9/2003 | Kleinman | H04L 9/0822 380/278 |
| 6,816,910 B1* | 11/2004 | Ricciulli | H04L 41/0896 370/216 |
| 6,839,346 B1* | 1/2005 | Kametani | H04L 45/00 370/389 |
| 6,941,366 B2* | 9/2005 | Antes | H04L 63/0272 370/248 |
| 7,231,517 B1* | 6/2007 | Mashayekhi | H04L 63/045 709/229 |
| 7,234,058 B1* | 6/2007 | Baugher | H04L 9/0833 380/259 |
| 7,266,715 B1* | 9/2007 | Bazzinotti | H04L 63/0272 714/4.21 |
| 7,324,547 B1* | 1/2008 | Alfieri | H04L 12/5693 370/412 |

(Continued)

FOREIGN PATENT DOCUMENTS

CN   101478389   10/2010

OTHER PUBLICATIONS

Kaufman et al., RFC 5996 IKEv2, IETF, Sep. 2010.*

*Primary Examiner* — David Garcia Cervetti
(74) *Attorney, Agent, or Firm* — Charles E. Bergere

(57) ABSTRACT

A security enhancement to IPSec processing is achieved by changing the algorithms used at each re-key after expiration or termination of a Security Association session between two peer nodes. The solution enables an Internet Key Exchange to negotiate multiple algorithms to ensure that every renewed IPSec Security Association has a different algorithm combination, thereby making attempts at decryption by an attacker more difficult.

20 Claims, 3 Drawing Sheets

(56) References Cited

U.S. PATENT DOCUMENTS

| | | | | |
|---|---|---|---|---|
| 7,421,578 B1* | 9/2008 | Huang | H04L 63/065 | 370/254 |
| 7,577,833 B2* | 8/2009 | Lai | H04L 63/0428 | 709/223 |
| 7,697,692 B2* | 4/2010 | Takata | H04L 9/083 | 380/277 |
| 7,730,327 B2* | 6/2010 | Plotkin | H04L 9/088 | 713/193 |
| 7,849,495 B1* | 12/2010 | Huang | H04L 63/062 | 713/153 |
| 7,984,495 B1* | 7/2011 | Aravind | H04L 12/4633 | 726/15 |
| 8,683,202 B2* | 3/2014 | Bucker | H04L 63/123 | 380/247 |
| 8,862,869 B1* | 10/2014 | Soon | H04L 63/0428 | 713/153 |
| 8,873,759 B2* | 10/2014 | Kurdziel | H04L 9/0836 | 380/278 |
| 9,135,208 B1* | 9/2015 | Huang | H04W 4/005 | |
| 9,141,823 B2* | 9/2015 | Dawson | G06F 21/6227 | |
| 9,264,230 B2* | 2/2016 | Arnold | H04L 9/0897 | |
| 2001/0037284 A1* | 11/2001 | Finkelstein | G06Q 40/04 | 705/37 |
| 2001/0042204 A1* | 11/2001 | Blaker | G06F 17/30949 | 713/165 |
| 2002/0133608 A1* | 9/2002 | Godwin | H04L 29/12009 | 709/230 |
| 2002/0178356 A1* | 11/2002 | Mattila | H04L 63/0442 | 713/156 |
| 2002/0188839 A1* | 12/2002 | Noehring | H04L 29/06 | 713/153 |
| 2004/0077341 A1* | 4/2004 | Chandranmenon | H04W 36/14 | 455/418 |
| 2004/0136533 A1* | 7/2004 | Takagaki | H04L 9/0891 | 380/255 |
| 2006/0269053 A1* | 11/2006 | Miyazawa | G06F 21/606 | 380/28 |
| 2007/0136589 A1* | 6/2007 | Magdi | H04L 9/3271 | 713/171 |
| 2007/0211900 A1* | 9/2007 | Tan | H04L 63/164 | 380/225 |
| 2008/0072301 A1* | 3/2008 | Chia | G06F 21/41 | 726/8 |
| 2008/0165964 A1* | 7/2008 | Lewis | H04L 63/0227 | 380/255 |
| 2008/0247545 A1* | 10/2008 | Teruyama | H04L 9/0841 | 380/255 |
| 2008/0307054 A1* | 12/2008 | Kamarthy | H04L 63/065 | 709/206 |
| 2009/0100075 A1* | 4/2009 | Karlsson | G06F 17/30575 | |
| 2009/0298504 A1* | 12/2009 | Lee | H04W 36/0011 | 455/437 |
| 2010/0203960 A1* | 8/2010 | Wilson | G07F 17/3241 | 463/29 |
| 2010/0246480 A1* | 9/2010 | Aggarwal | H04L 45/123 | 370/328 |
| 2010/0313023 A1* | 12/2010 | Ren | H04L 63/061 | 713/169 |
| 2011/0078436 A1* | 3/2011 | Sato | H04L 63/164 | 713/151 |
| 2012/0311683 A1* | 12/2012 | Klein | H04L 63/06 | 726/6 |
| 2013/0042313 A1* | 2/2013 | Lambert | H04W 12/04 | 726/7 |
| 2013/0246813 A1* | 9/2013 | Mori | G06F 17/30289 | 713/193 |
| 2013/0263249 A1* | 10/2013 | Song | H04L 63/18 | 726/14 |
| 2014/0325217 A1* | 10/2014 | Mori | G06F 21/6227 | 713/165 |
| 2015/0271145 A1* | 9/2015 | Jalisatgi | H04L 63/0428 | 713/168 |

* cited by examiner

201

```
                     1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
! Next Payload  !C! RESERVED  !         Payload Length          !
+-+-+-+-+-+-+-+-+-+-+-+-+-+-+-+-+-+-+-+-+-+-+-+-+-+-+-+-+-+-+-+-+
!  Protocol ID  !   SPI Size  !      Notify Message Type        !
+-+-+-+-+-+-+-+-+-+-+-+-+-+-+-+-+-+-+-+-+-+-+-+-+-+-+-+-+-+-+-+-+
!                                                               !
~                Security Parameter Index (SPI)                 ~
!                                                               !
+-+-+-+-+-+-+-+-+-+-+-+-+-+-+-+-+-+-+-+-+-+-+-+-+-+-+-+-+-+-+-+-+
!                                                               !
~                       Notification Data                       ~
!                                                               !
+-+-+-+-+-+-+-+-+-+-+-+-+-+-+-+-+-+-+-+-+-+-+-+-+-+-+-+-+-+-+-+-+
```

Initiator                              Responder
---------                              ---------

HDR, SAi1, KEi, Ni           - ->

<- - HDR, SAr1, KEr, Nr, [CERTREQ]

HDR, SK {IDi, [N,] [CERT,]
[CERTREQ,] [IDr,]
AUTH, SAi2, TSi, TSr}        - ->

<- - HDR, SK {IDr, [CERT,] AUTH,
                                            SAr2, TSi, TSr}

SECURE COMMUNICATION DEVICE AND METHOD

BACKGROUND OF THE INVENTION

The present invention relates generally to secure communications and, more particularly, to a method and device for secure Internet Protocol Security communications between network peer nodes.

IPSec (Internet Protocol Security) is one currently popular Internet protocol for ensuring secure communications between peer nodes. IPSec is a set of protocols defined by the Internet Engineering Taskforce that provides a security mechanism at the IP layer. IPSec processing involves encapsulation of outgoing packets and de-encapsulation of inbound packets. The so-called "Encapsulating Security Payload" (ESP) protocol provides confidentiality, data integrity, and data source authentication of IP packets. This requires the insertion of an ESP header after the IP header of an IP packet but in front of the data to be protected. An ESP trailer is inserted after the data to be protected. An ESP packet is identified by the protocol field in the IP header. In order to allow IPSec packets to be properly encapsulated and de-encapsulated, it is necessary to associate security services and a key between the traffic being transmitted and the remote node that is the intended recipient of the traffic. The construct used for this purpose is a "Security Association" (SA). A SA is a relationship between two or more nodes that describes how the nodes will use security services to communicate securely.

IPSec provides many options for performing network encryption and authentication. Each IPSec connection can provide encryption, integrity, authenticity, or all three. When the security service is determined, the two IPSec peers must determine exactly which algorithms to use (for example, Triple DES (3DES) for encryption, SHA-1 for integrity and authentication). After deciding on the algorithms, the two devices must share session keys. SAs (Security Associations) are negotiated between peer nodes using a mechanism known as "Internet Key Exchange" (IKE) or IKE version 2 (IKEv2) protocols, and are allocated an identification known as a "Security Parameter Index" (SPI). Details of the existing SAs and the respective SPIs are usually maintained in a Security Association Database (SAD) that is associated with each IPSec node. The precise way in which IPSec is implemented in a system depends to a large extent upon the security policy of the organization wishing to employ IPSec. The policy is stored in a Security Policy Database (SPD), which is also associated with each IPSec node.

IPSec SAs may terminate through deletion or by timing out. An SA can time out when a specified amount of time has elapsed or when a specified number of bytes have passed through the secure tunnel established by the IPSec process. When subsequent IPSec SAs are needed for a data flow, an IKEv2 procedure re-establishes the connection using a renewal process. In known IKEv2 renewal processes, renewal is done with the same combination of algorithms that were originally negotiated. Using the same combination of algorithms could constitute a weakness in the overall security of the process. It would be advantageous to provide a way of providing higher security processing for data transmission.

BRIEF DESCRIPTION OF THE DRAWINGS

The invention, together with objects and advantages thereof, may best be understood by reference to the following description of preferred embodiments together with the accompanying drawings in which:

FIG. 2 is a diagram showing modifications to a conventional notification payload and IKEv2 negotiation in accordance with an embodiment of the invention and FIG. 3 is a simplified flow chart of an example of a method for ensuring secure communications between network nodes in accordance with the invention.

DETAILED DESCRIPTION OF PREFERRED EMBODIMENTS

Figure 1:
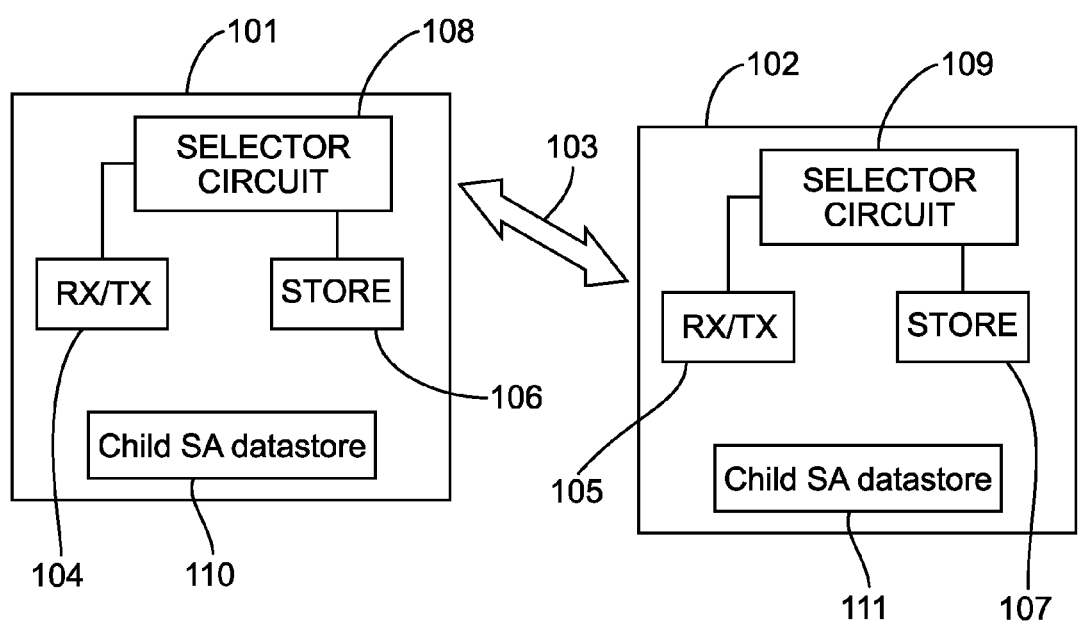
FIG. 1 is a simplified block diagram of network components capable of operating in accordance with an embodiment of the invention and forming a part of a communications network.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a method of managing IP SAs between two nodes, where one of the two nodes acts as an initiator and the other acts as a responder in a SA process. The method comprises: providing local policies for configuring sets of algorithms at each node; at an initiator node, sending a message for initiating a first SA, wherein the message identifies the algorithms configured in the initiator node, receiving at a responder node, the message and in response, identifying a matching set of algorithms that are common to those configured in the responder and the initiator nodes; selecting a first algorithm combination from the matching set of algorithms to create a first SA, sending a list of negotiated combinations of algorithms comprising the selected first combination of algorithms and other matching combinations of algorithms to the initiator node, wherein both nodes use the first combination of algorithms to create the first SA and both store the negotiated combinations of algorithms for use by both first and second nodes subsequently; and on a rekey following termination of a SA; at an initiator node, selecting a further algorithm combination from the list of negotiated combinations of algorithms that is different from a previously selected algorithm combination for use by the responder and initiator in a further SA.

In other embodiments, there can be any number of rekeys and any number of algorithms combinations.

In another embodiment, the present invention provides a network device for supporting secure communications with a remote device, the network device including a local policy for configuring a set of algorithms for negotiation between the network device and the remote device; a memory; and a selection circuit for selecting an algorithm combination. The network device is arranged to: receive from the remote device, a message for initiating a first SA wherein the message identifies a set of algorithms supported by the remote device; compile a list of algorithms that are common to those identified in the message and in the local policy; select a first algorithm combination from the compiled list for creation of a first SA; send a response comprising a list of negotiated combinations of algorithms comprising the first combination of algorithms and other matching combinations of algorithms to the remote device; use the first algorithm combination to create the first SA; store, in the memory, the list of negotiated combinations of algorithms; and initiate a rekey on termination of a SA and select a further algorithm combination from the list of negotiated combinations of algorithms which is different from a previously selected algorithm combination for use by the network device and remote device in a further SA.

Advantageously, the invention permits multiple algorithms and multiple combinations of algorithms to be negotiated as part of an IKEv2 process via SA payloads for IPSec. Also advantageously, as different algorithms combinations are used for subsequent renewals, a potential attacker has more difficulty in understanding the keys being used. If one algorithm combination should be broken by an attacker, there is no need for an administrator to make any configuration changes. Further, the algorithms to be negotiated and the algorithms combinations to be used can be conveniently defined by a local policy.

Referring now to FIG. 1, a first network device 101 (or peer node) of a communication system and a second network device 102 (or peer node) that can communicate with each other via a secure tunnel 103 are shown. Each network device 101, 102 includes a transceiver 104, 105, respectively, for transmitting and receiving data and control signals. Each network device 102 also includes a store 106, 107, respectively for local policies containing a multiplicity of algorithms and a selector circuit 108, 109, respectively, connected to its respective transceiver 104, 105 and its respective store 106, 107 for selecting algorithms from the respective store. Each network device also includes a CHILD SA datastore (i.e., local memory) 110, 111, respectively. Each of the first and second network devices 101, 102 are capable of IPSec processing, supporting IKEv2 and also of supporting an enhanced "HIGH SECURITY IPSec" mode of operation in accordance with the invention. Either network device 101, 102 can be an initiator of a SA process or a responder.

In some embodiments, an IPSec SA can be created between the two nodes 101, 102 for ESP protocol/AH (Authentication Header) protocol along with an option of selecting IP compression protocol. Depending on the configuration of an IPSec (SPD policy), a message from one of the network devices acting as an initiator and sent to the other network device acting as the responder, may contain the identity of an encryption algorithm, an authentication algorithm, an integrity algorithm and an IP compression algorithm. All algorithms are held in the initiator's store. In one example, when the IPSec SPD policy is configured with AH protocol, there is only one authentication algorithm and no encryption/integrity and compression algorithms need to be negotiated or stored. However, the authentication algorithm can have one or more known selectable configurations such as MD5/SHA-1/SHA-2/etc. In an alternative example, when the IPSec SPD policy is configured with ESP protocol there can be an encryption algorithm with the option of an integrity algorithm.

IKEv2 defines a notification payload that can be used to indicate the sender's capability (among other uses). The diagram of FIG. 2 shows the notification payload as defined in IPSec RFC 4036 at 201 and the modifications at 202 made to the exchanges in accordance with an example of the invention. In this example, a new notification type "HIGH SECURITY SUPPORTED" is defined. The value for this new type can be used from the reserved/private range, for example 41000. With reference to the list of exchanges 201, the modifications are [N] at the initiator and [SAr2] at the responder.

The initiator indicates its capabilities (to the responder) by sending the Notification payload with "Notify Message Type" set to HIG_SECURITY_SUPPORTED in the third IKEv2 message. Also in accordance with IKEv2, the initiator also sends the list of 'proposals' (each proposal having one or more transforms) that it can support in the same message as part of SAi2. A proposal lists the algorithms and protocols that are to be negotiated with the responder.

If the responder understands and supports HIGH_SECURITY_SUPPORTED notify message type and it wants to operate with the High Security enhancement, then it replies (to the initiator) with the supported list of all proposals from the list it received where the first proposal should contain only one set of algorithms and the remaining proposals may contain one or more sets of algorithms. This latter step can, in some embodiments, can be a configuration option. The responder then creates a first IPsec SA with the first proposal in the list that it sends out. In one example, it also maintains a matching list of proposals to be used for subsequent SAs in its child SA information data store (i.e., memory).

When the Initiator receives the fourth IKEv2 message, it creates IPsec SA with the first proposal in the list. If more proposals exist, in one embodiment, it will update its child SA information data store with the list of proposals to be used for subsequent renewals.

For the renewal of IPsec SA, the IKE process is aware of the next proposal in the list that can be used for renewing the next SA. The order in which the proposals are chosen can be dictated by a local security policy. For example, it can be random, round robin, or a particular sequence can be dictated by the local policy or other appropriate mechanism.

Rekeying from both sides (i.e., initiator and responder) at the same time with different proposals can happen and IKEv2 RFC already has a mechanism in place to handle such cases.

Figure 3:
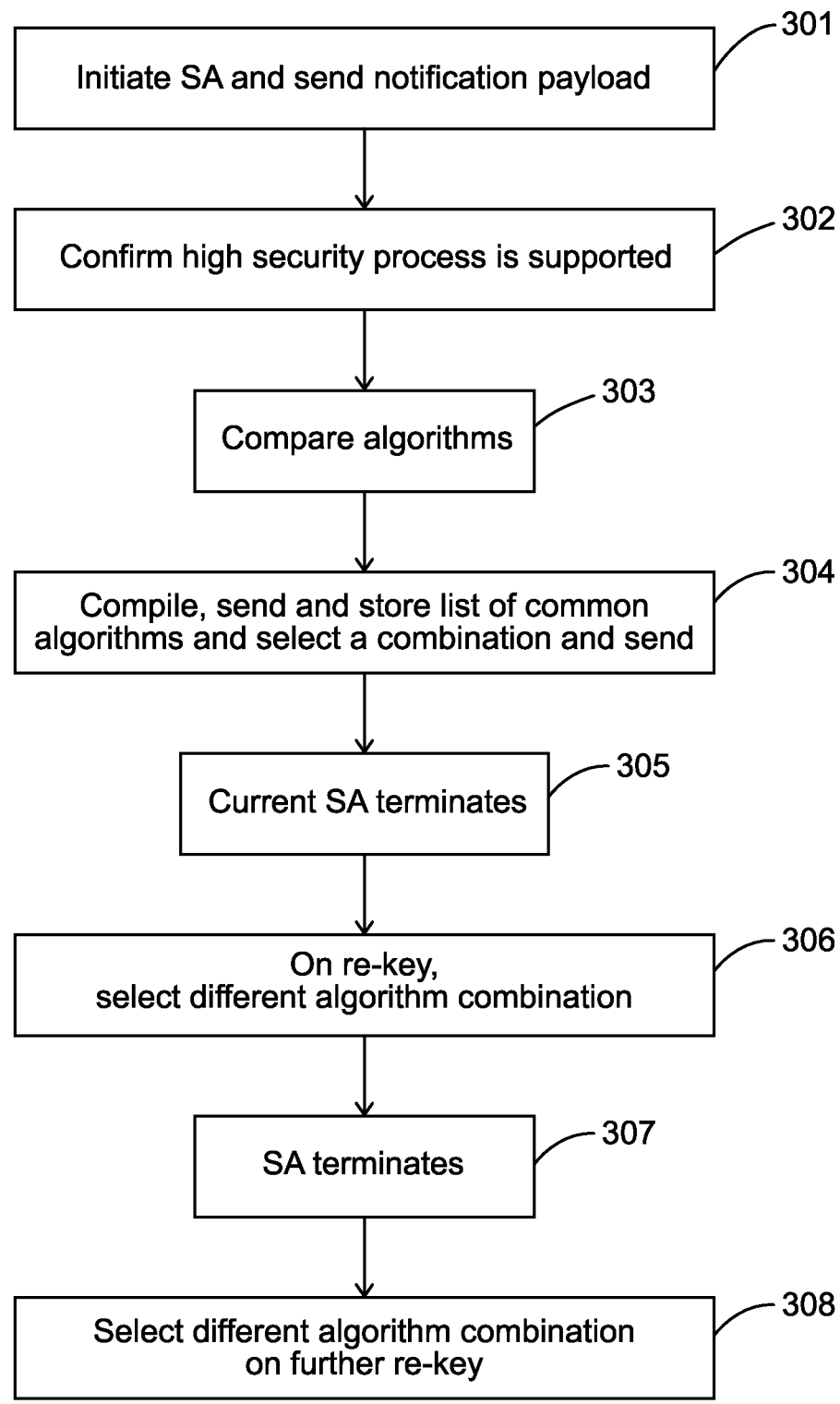

A further example of operation of a method for secure data processing in accordance with an embodiment of the invention will now be described with reference to FIG. 3. In this example, two peer nodes, such as the network devices 101 and 102 of FIG. 1, both support the High Security functionality as described above.

In a first step at 301, in an authentication request, a HIGH_SEC_SUPPORTED notification payload is sent from the first network device, which acts as an initiator, to the second network device acting as responder, where the notification type is 41000. In response, at 302, the responder sends a HIGH_SEC_SUPPORTED notification payload to the initiator confirming that it supports the high security process.

In this example, the local policy is configured to be ESP with authentication. The first network device is configured with algorithm types as follows: encryption algorithm and integrity algorithm. The encryption algorithm has several configurations, namely, in this example, 3DES, AES-CBC-128, AES-CTR-128, and AES-CTR-256. The integrity algorithm also has several configurations, which in this example are: MD5, SHA-1, and SHA2-256. The second network device is similarly configured with algorithm types as follows encryption algorithm and integrity algorithm. However, the encryption algorithm has configurations as follow: 3DES, AES-CBC-128, CAMELIA, and AES-CTR-256, and the integrity algorithm has configurations: MD5, SHA-1, and SHA2-128. At 303, the first network device (as initiator) apprises the second network device (as responder) of its algorithm types and configurations whereupon the second network device compares them with its own.

At 304, the second network device generates a list which comprises algorithms that are common to both network devices. In this example, these are, for encryption: 3DES, AES-CBC-128, and AES-CTR-256, and for integrity: MD5 and SHA-1. It also selects a first combination of algorithms (as an example, 3DES as encryption algorithm and SHA-1 as integrity algorithm) for creation of a first SA. This list along with the first combination of algorithms is sent by the second network device to the first network device and is stored in both network devices. This list comprises a negotiated set of algorithms from which various combinations of algorithms can be selected by either network device when renewing a SA.

When the current SA terminates (at 305) and further renewals (or 'rekeys') are required, then at 306, either first or second network device, acting as the initiator, selects from the stored list of negotiated algorithms, a different encryption and integrity algorithm combination (for example, 3DES and MD5) and sends it to the responder for use in the renewed data exchange session.

When the SA terminates again (at 307) at a subsequent rekey, (308) a different algorithm combination is selected, (for example, 3DES and SHA-1) thereby providing enhanced security.

In a further example, a first network device (or node) is configured with an 'ESP with authentication' local policy where it contains two proposals. The first proposal specifies encryption algorithm configurations 3DES, AES-CBC-128 and integrity algorithm configuration MD5. The second proposal specifies a single encryption algorithm, CAMELLIA and integrity algorithms SHA-1, SHA2-128, SHA2-192.

A second network device (node) is also configured with an 'ESP with authentication' local policy with encryption algorithm configurations: 3DES, AES-CBC-128, CAMELLIA, and AES-CTR-256, and integrity algorithm configurations MD5, SHA-1, and SHA2-128.

Say that the first network device (node) acts as the initiated for first SA. It apprises the second network device, (the responder), of the two proposals and their respective compositions as described above. On receiving this information, the second network device (node) checks it against its own local policy and finds that it has some algorithm configurations in common with the proposals. The second network device compiles a first list (first proposal) of common algorithms comprising 3DES, AES-CBC-128 (encryption) and MD5 (integrity). A second list (second proposal) of common algorithms comprising CAMELLIA (encryption), SHA1, and SHA2-128 (integrity) is also compiled. The lists are stored at both first and second nodes.

When a first rekey is required, any algorithm combination comprising algorithms from either compiled list can be selected by the node which initiates the rekey. For example, a first rekey is initiated with algorithm combination 3DES-MD5 (from the first list). A second rekey is initiated with a different algorithm combination, for example, CAMELLIA and SHA1 (from the second list). A third rekey is initiated with a further, different algorithm combination; AES-CBC-128 and MD5 (from the first list). A fourth rekey algorithm combination reverts to the second algorithm combination. A fifth rekey is initiated with a further different algorithm combination, CAMELLIA, and SHA2-128 which uses one algorithm from the first list and one from the second list.

The invention may be implemented in a computer program for running on a computer system, at least including code portions for performing steps of a method according to the invention when run on a programmable apparatus, such as a computer system or enabling a programmable apparatus to perform functions of a device or system according to the invention. As an example, a non-transitory computer-readable medium may be provided having computer-readable instructions stored thereon for performing methods according to the invention as described herein. The non-transitory computer-readable medium may comprise at least one from a including a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method of managing Internet Protocol Security Associations between two nodes, wherein one of the two nodes acts as an initiator node and the other of the two nodes acts as a responder node in a Security Association (SA) process, the method comprising:

storing local policies in respective memories of the two nodes for configuring sets of algorithms at the nodes;

at the initiator node, sending a message to initiate a first SA, wherein the message identifies the algorithms configured in the initiator node;

at the responder node, receiving the message and in response, identifying a matching set of algorithms stored in the responder node memory that are common to the sets of algorithms configured in both the responder and the initiator nodes;

selecting, with a selector circuit of the responder node, a first algorithm combination from the matching set of algorithms to create the first SA, and sending a list of negotiated combinations of algorithms comprising the selected first algorithm combination and other matching combinations of algorithms to the initiator node, wherein both nodes use the first algorithm combination to create the first SA and both nodes store the negotiated combinations of algorithms for subsequent use; and on a rekey following termination of a SA, at the initiator node, selecting a further algorithm combination from the list of negotiated combinations of algorithms that is different from a previously selected algorithm combination for use by the responder and initiator nodes in a further SA.

2. The method of claim 1, wherein an algorithm combination comprises one or more of the following:
   an encryption algorithm having one of several selectable configurations;
   an authentication algorithm having one of several selectable configurations;
   an authenticated encryption algorithm having one of several selectable configurations;
   an integrity algorithm having one of several selectable configurations; and
   a compression algorithm having one of several selectable configurations.

3. The method of claim 2, wherein an algorithm type is a symmetric cryptographic algorithm type comprising one of the following:
   an encryption algorithm;
   an authentication algorithm:
   an authenticated encryption algorithm;
   an integrity algorithm; and
   a compression algorithm.

4. The method of claim 1, wherein a set of algorithms comprises one or more algorithm types and wherein each algorithm type comprises one or more algorithm configurations.

5. The method of claim 1, wherein an algorithm combination is selected in accordance with a predetermined policy.

6. The method of claim 1, wherein an algorithm combination is selected in a random fashion.

7. The method of claim 1, wherein an algorithm combination is selected in a round robin fashion.

8. The method of claim 1, wherein the first SA uses an Internet Key Exchange (IKE) process.

9. The method of claim 8, wherein the IKE process is an IKEv2 process.

10. The method of claim 9, wherein the IKE process defines a notification payload confirming a capability of a network node of selecting differing combinations of stored algorithms for use in SA renewal.

11. A network device for supporting secure communications with a remote device, the network device comprising:
   a memory that stores a local policy for configuring a set of algorithms for negotiation between the network device and the remote device;
   a receiver that receives messages from the remote device;
   a transmitter that sends messages to the remove device; and
   a selection circuit connected to the memory for selecting an algorithm combination from the set of algorithms,
   wherein the receiver receives from the remote device, a message for initiating a first Security Association (SA) wherein the message identifies a set of algorithms supported by the remote device;
   wherein the selection circuit generates a list of algorithms that are common to the set of algorithms identified in the message and the set of algorithms configured by the local policy;
   wherein the selection circuit selects a first algorithm combination from the compiled list for creation of a first SA;
   wherein the transmitter sends a response to the remote device, comprising a list of negotiated combinations of algorithms comprising the first combination of algorithms and other matching combinations of algorithms;
   wherein the first algorithm combination is used to create the first SA;
   wherein the selection circuit stores, in the memory, the list of negotiated combinations of algorithms and initiates a rekey on termination of the first SA and selects a further algorithm combination from the list of negotiated combinations of algorithms that is different from a previously selected algorithm combination for use by the network device and remote device in a further SA.

12. The network device of claim 11, wherein an algorithm combination comprises one or more of the following:
   an encryption algorithm having one of several selectable configurations;
   an authentication algorithm having one of several selectable configurations;
   an authenticated encryption algorithm having one of several selectable configurations;
   an integrity algorithm having one of several selectable configurations; and
   a compression algorithm having one of several selectable configurations.

13. The network device of claim 12, wherein an algorithm type is a symmetric cryptographic algorithm type comprising one of the following:
   an encryption algorithm;
   an authentication algorithm;
   an authenticated encryption algorithm;
   an integrity algorithm; and
   a compression algorithm.

14. The network device of claim 11, wherein a set of algorithms comprises one or more algorithm types, wherein each algorithm type comprises one or more algorithm.

15. The network device of claim 11, wherein the selection circuit selects an algorithm combination in accordance with a predetermined policy.

16. The network device of claim 11, wherein the selection circuits selects an algorithm combination in a random fashion.

17. The network device of claim 11, wherein the selection circuits selects an algorithm combination in a round robin fashion.

18. The network device of claim 11, wherein the network device negotiates the first SA with the remote node using an Internet Key Exchange (IKE) process.

19. The network device of claim 18, wherein the IKE process is an IKEv2 process.

20. The network device of claim 19, wherein the network device inserts a notification payload in an IKE that confirms a capability of selecting differing combinations of stored algorithms for use in a SA renewal.

* * * * *